United States Patent
Dykes et al.

(10) Patent No.: US 9,574,590 B2
(45) Date of Patent: Feb. 21, 2017

(54) TOGGLE LATCH FOR SEQUENTIALLY EXTENDED MECHANICAL MAST

(71) Applicants: THE WILL-BURT COMPANY, Orrville, OH (US); Neil David Dykes, Bacup (GB); Paul B. Blackwelder, Medina, OH (US); Anatol Kwartler, Silver Lake, OH (US); Rexford R. Mast, Wooster, OH (US); Andrew Paul Wasson, Wooster, OH (US); Michael James Kardohely, West Salem, OH (US); Douglas A. Jacobs, Wooster, OH (US)

(72) Inventors: Neil David Dykes, Bacup (GB); Paul B. Blackwelder, Medina, OH (US); Anatol Kwartler, Silver Lake, OH (US); Rexford R. Mast, Wooster, OH (US); Andrew Paul Wasson, Wooster, OH (US); Michael James Kardohely, West Salem, OH (US); Douglas A. Jacobs, Wooster, OH (US)

(73) Assignee: The Will-Burt Company, Orrville, OH (US)

( * ) Notice: Subject to any disclaimer, the term of this patent is extended or adjusted under 35 U.S.C. 154(b) by 165 days.

(21) Appl. No.: 14/246,535

(22) PCT Filed: Nov. 2, 2012

(86) PCT No.: PCT/US2012/063293
§ 371 (c)(1),
(2) Date: Apr. 7, 2014

(87) PCT Pub. No.: WO2013/067330
PCT Pub. Date: May 10, 2013

(65) Prior Publication Data
US 2015/0050070 A1    Feb. 19, 2015

Related U.S. Application Data

(60) Provisional application No. 61/555,722, filed on Nov. 4, 2011.

(51) Int. Cl.
*F16B 7/10*    (2006.01)
*F16B 7/14*    (2006.01)
(Continued)

(52) U.S. Cl.
CPC . *F16B 7/14* (2013.01); *B60Q 1/05* (2013.01); *E04H 12/182* (2013.01); *F16B 7/105* (2013.01);
(Continued)

(58) Field of Classification Search
CPC .......... Y10T 403/32475; E04H 12/182; H01Q 1/103; H01Q 1/1235; B60Q 1/05; F16B 7/105; F16B 7/14; F21V 21/22
See application file for complete search history.

(56) References Cited

U.S. PATENT DOCUMENTS 3,874,136 A * 4/1975 Michel ........................... 52/115
4,254,423 A   3/1981 Reinhard
(Continued)

FOREIGN PATENT DOCUMENTS

DE        31 16770       11/1982
DE    20 2006 007 012     7/2006
(Continued)

*Primary Examiner* — Daniel P Stodola
*Assistant Examiner* — Matthew R McMahon
(74) *Attorney, Agent, or Firm* — Fay Sharpe LLP

(57) ABSTRACT

A telescoping mast having a latch assembly includes a latch body mountable to a first tube section, a latch mechanism supported by the latch body, a toggle mechanism operatively connected to the latch mechanism, and a latch plate mountable to a second tube section. The latch mechanism includes a pawl member pivotably between an engaged position for (Continued)

interlocking with a corresponding recess in the latch plate to thereby restrict axial movement between the first and second tube sections, and a disengaged position allowing relative axial movement between the first and second tube sections. The toggle mechanism is movable between an over-center locked configuration corresponding to the engaged position of the latch mechanism and an unlocked configuration corresponding to the disengaged position of the latch member.

12 Claims, 6 Drawing Sheets

(51) Int. Cl.
    *H01Q 1/12*         (2006.01)
    *E04H 12/18*       (2006.01)
    *B60Q 1/05*        (2006.01)
    *F21V 21/22*       (2006.01)
    *H01Q 1/10*        (2006.01)

(52) U.S. Cl.
    CPC .............. *F21V 21/22* (2013.01); *H01Q 1/103* (2013.01); *H01Q 1/1235* (2013.01); *Y10T 403/32475* (2015.01)

(56) References Cited

U.S. PATENT DOCUMENTS

| | | | |
|---|---|---|---|
| 4,644,617 A * | 2/1987 | Tupper et al. ................... | 24/611 |
| 4,663,900 A | 5/1987 | Rehm et al. | |
| 4,860,668 A * | 8/1989 | Baudenbacher .............. | 108/146 |
| 5,218,375 A * | 6/1993 | Hillman ........................ | 343/883 |
| 5,593,129 A * | 1/1997 | Adams et al. ................. | 248/405 |
| 6,000,354 A | 12/1999 | Vanlerberghe | |
| 7,234,847 B2 * | 6/2007 | Yoshimori et al. ........... | 362/403 |
| 7,768,473 B2 * | 8/2010 | Kardohely ..................... | 343/883 |
| 8,191,322 B2 * | 6/2012 | Liestenfeltz et al. ........... | 52/212 |
| 8,413,390 B2 * | 4/2013 | Pereira ........................... | 52/111 |
| 2007/0014116 A1 | 1/2007 | Yoshimori et al. | |
| 2009/0110527 A1 | 4/2009 | Kardohely | |
| 2009/0145056 A1* | 6/2009 | Pereira ........................... | 52/111 |

FOREIGN PATENT DOCUMENTS

| | | |
|---|---|---|
| JP | S52-038891 | 0/1977 |
| JP | S62-180148 | 8/1987 |
| JP | 2005-203237 | 7/2005 |
| JP | 2009-007848 | 1/2009 |
| WO | WO 93-07395 | 4/1993 |
| WO | WO 2009/058241 | 5/2009 |

* cited by examiner

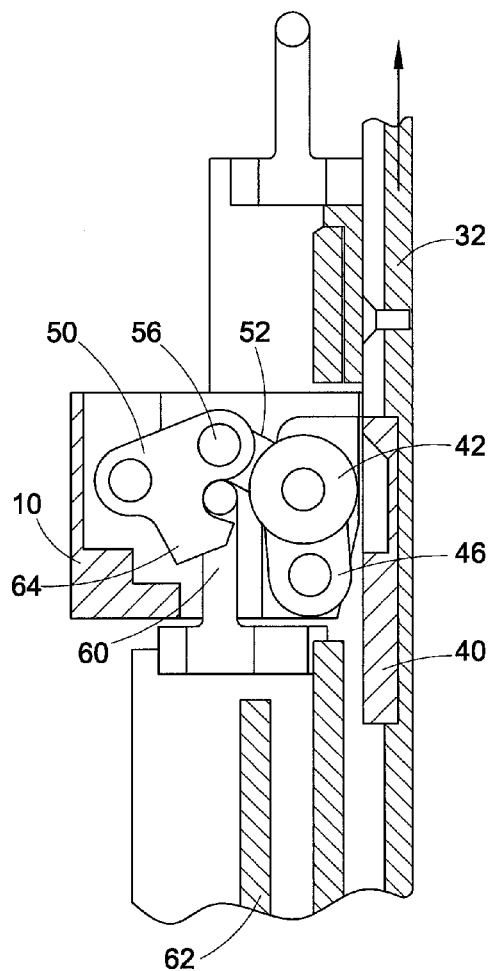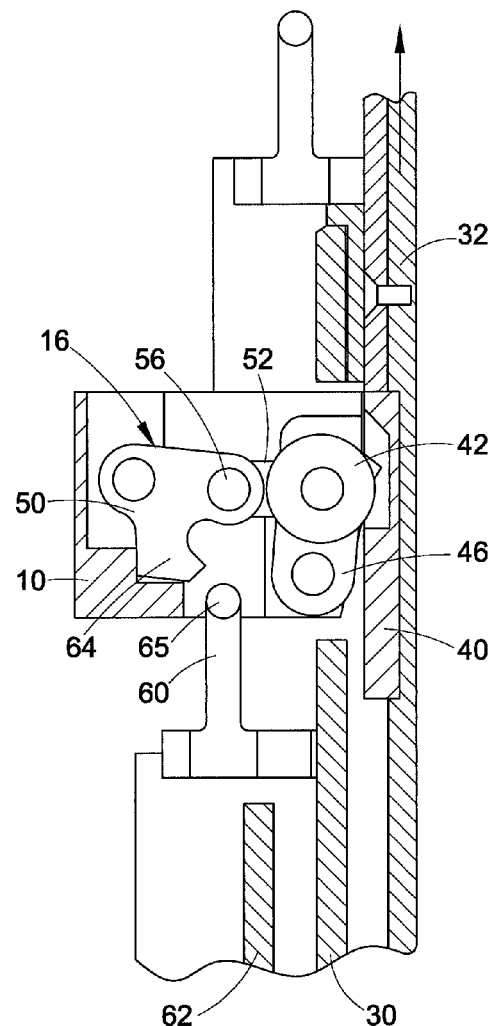
FIG. 4
FIG. 5

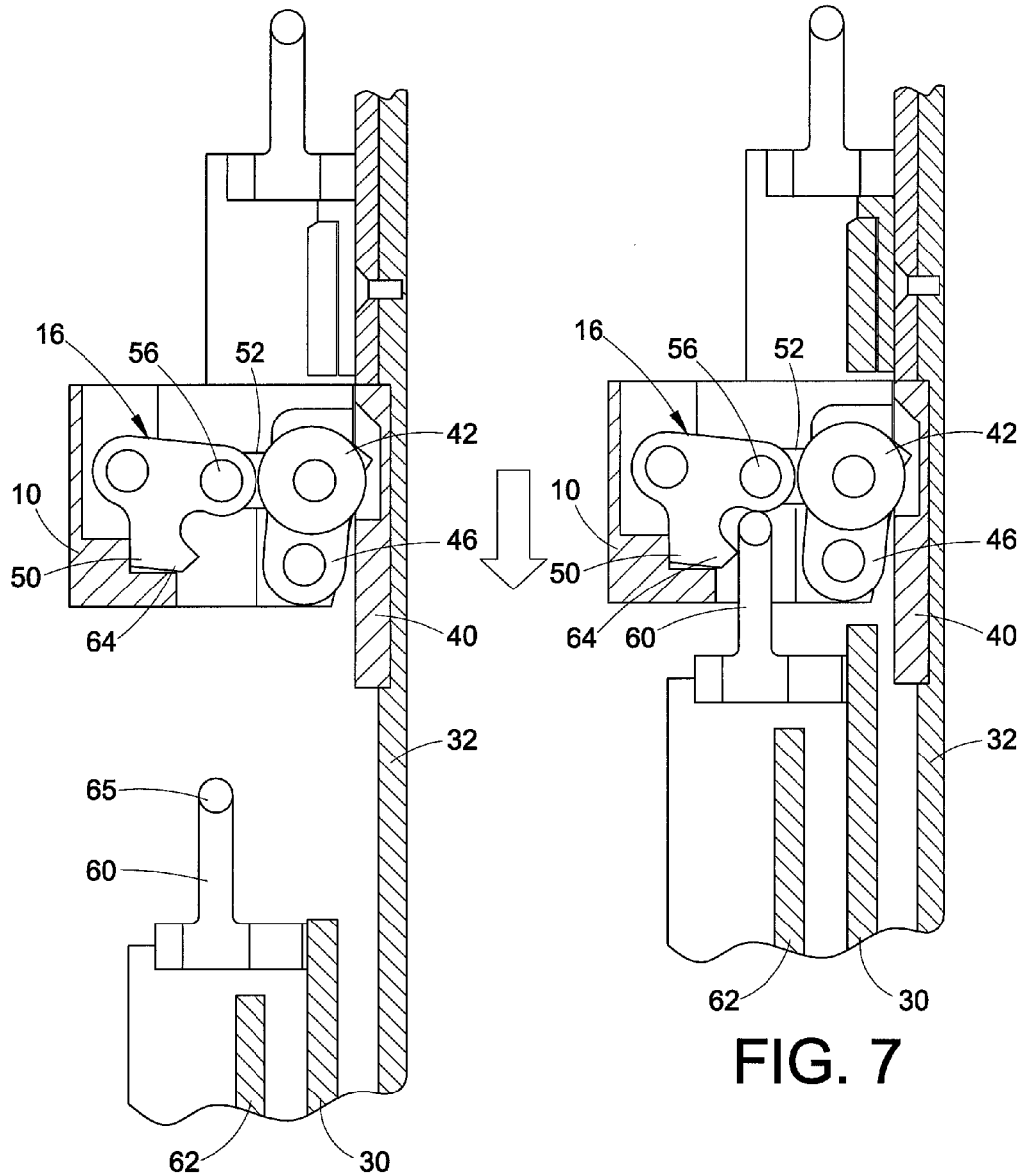

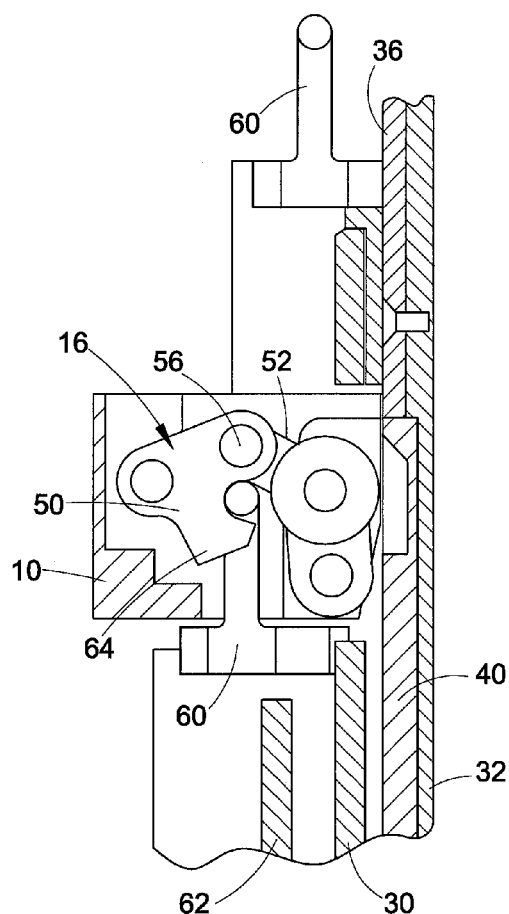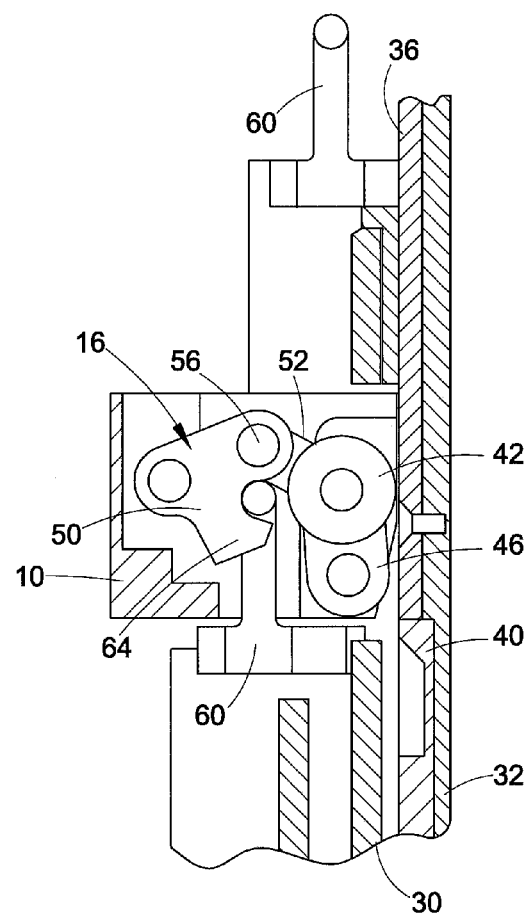

TOGGLE LATCH FOR SEQUENTIALLY EXTENDED MECHANICAL MAST

RELATED APPLICATIONS

This application is the National Stage of International Application No. PCT/US2012/063293, filed Nov. 2, 2012, which claims the benefit of U.S. Provisional Application No. 61/555,722, filed on Nov. 4, 2011, which are incorporated herein by reference in their entirety.

BACKGROUND

The present exemplary embodiment relates to masts. It finds particular application in conjunction with telescoping masts for antennas, lights and other payloads, and will be described with particular reference thereto. However, it is to be appreciated that the present exemplary embodiment is also amenable to other like applications.

Telescoping masts generally include multiple tube sections that are configured to telescope or nest within each other. A drive system is typically configured to sequentially deploy and/or retract the tubes between extended and retracted configurations. Locks or latches are generally used to lock each tube to its adjacent tube or tubes when in the extended configuration.

High-end telescoping mast customers, particularly military customers, are using mechanical masts for vehicle mounted, unguyed payload elevation involving highly sensitive surveillance and targeting electronics. These electronics are often used in an attempt to view objects over very long distances and are adversely affected by poor stability. In many applications, maintaining line-of-sight to targets is very important.

There are generally two techniques used to stabilize the payload of a telescoping mast. A first technique is gyro stabilization. Gyro stabilization can be used but it adds significant weight and cost to the payload. A second technique uses sophisticated algorithms to correct the captured image and maintain sight of their "target", but such technique is not highly effective for rapid and "unpredictable" movements.

The interaction of external forces (such as wind) and clearances in the mast joints cause rapid and "unpredictable" movements that decrease the performance of long range "viewing" payloads. These movements can be small changes in heading (north, south, east, west), commonly called rotation and/or small changes in relation to the horizon, commonly called deflection.

The current art generally attempts to limit rotational movement via direct interaction between the tubes. The bottom, or base, tube is rigidly attached to a vehicle or shelter. In the case of cylindrical tubes, all of the subsequent tubes above that tube are prevented from rotating by a raised or recessed surface that creates at least one edge along the entire length of the tubes. That edge interacts with a groove or protrusion on the mating tubes such that any two tubes can slide axially (extend/retract) relative to each other but are prevented from rotating with respect to the each other and the base tube. This is commonly called "keying" the tubes or a "key" and "keyway" arrangement. In the case of non-cylindrical tubes, the shape of the tube itself prevents rotation via interaction of the corners of tubes.

The current art similarly attempts to limit deflection via direct interaction between the tubes. Again the bottom, or base tube, is rigidly attached to a vehicle or shelter. The subsequent tubes, even when fully extended, maintain a substantial overlap. That is, each tube remains inside the tube below it by a significant percentage of its length, commonly called "lap distance". With this lap distance and by maintaining a close fit between the outer diameter of one tube and the inner diameter of the tube below it, the amount that one tube can freely tilt with respect to the tube below it is limited.

To allow the sliding movement (extension and retraction of the mast) under reasonable manufacturing tolerances and under typical military environmental conditions (hot, cold, sand, dust, ice) clearance must be maintained between the interacting surfaces to prevent binding. That clearance directly causes increased rotation and deflection.

The locks or latches on each tube provides vertical support against the weight of the payload to keep the tube extended after it has been driven to its extended position by the mast drive system. It is generally considered desirable to have such locks be automatically driven by the normal extension/retraction of the mast so that no outside power is required (for simplicity) and no manual intervention is required (for safety and to allow remote operation). The locks are a source of noise that can, in some instances, make the mast unfit for certain applications (e.g., military application).

Current lock designs tend to be noisy, require a large space, require manual engagement, and/or require a separate power source. In addition, many lock designs only lock the tubes in the extended position.

BRIEF DESCRIPTION

In accordance with one aspect of the disclosure, an automatic locking system is provided that is driven by the normal extension and retraction of the mast, reduces the inherent rotation and deflection of the mast due to clearances, and operates more smoothly and quietly than conventional locking systems. The locking system also fits reasonably within the existing footprint of a typical mechanical mast.

In accordance with another aspect, a latch assembly for a telescoping mast having a plurality of telescoping tube sections comprises a latch body mountable to a first associated tube section, a latch mechanism supported by the latch body, a toggle mechanism operatively connected to the latch mechanism, and a latch plate mountable to a second associated tube section. The latch mechanism includes a pawl member pivotably between an engaged position for interlocking with a corresponding recess in the latch plate to thereby restrict axial movement between the first and second tube sections, and a disengaged position allowing relative axial movement between the first and second tube sections. The toggle mechanism is movable between an over-center locked configuration corresponding to the engaged position of the latch mechanism and an unlocked configuration corresponding to the disengaged position of the latch member.

The toggle mechanism can include a cam plate pivotally secured to the latch body, and a connecting arm pivotally connected to the cam plate at a pivot joint and operatively connected to the pawl, the pivot joint configured to rotate over center with respect to a point of attachment of the pawl to the latch body. The pawl can include an inclined surface for mating with a corresponding inclined surface of the latch plate when the pawl member is in the engaged position, said inclined surface restricting relative rotation between the first and second associated tubes when the latch mechanism is engaged. The pawl can include an inclined surface having a compound angle for mating with a corresponding inclined surface of the latch plate. The latch body can include a mounting flange for securing the latch body to an associated tube section.

The assembly can further include a trigger post mountable to an adjacent tube section, wherein the toggle mechanism includes a cam plate configured to interlock with the trigger post of an adjacent associated tube section, the trigger post operative to toggle the toggle mechanism between the lock and unlocked position based on relative movement between adjacent tube sections. The trigger post can include a T-shape portion thereof having a stem portion and a top portion generally perpendicular to the stem portion, and the cam plate can include catch portions adapted to interlock with respective opposite sides of the top portion on respective opposite sides of the stem portion. The toggle mechanism can be configured to move to the lock position when the trigger post is drawn away from the latch body, and to the unlocked position when the trigger post impinges on the toggle mechanism when the trigger post is brought towards the latch body.

In accordance with another aspect, a telescoping mast comprises a plurality of telescoping tube sections, a latch body mounted to a first tube section and supporting a latch mechanism and a toggle mechanism operatively connected to the latch mechanism, and a latch plate mounted to a second tube section, said second tube section adapted to be telescopically received within the first tube section. The latch mechanism includes a pawl member pivotable between an engaged position for interlocking with a corresponding recess in the latch plate to thereby restrict axial movement between the first and second tube sections when the second tube section is extended, and a disengaged position allowing relative axial movement between the first and second tube sections such that the second tube section can be telescoped into the first tube section. The toggle mechanism is movable between an over-center locked configuration corresponding to the engaged position of the latch mechanism and an unlocked configuration corresponding to the disengaged position of the latch member.

The toggle mechanism can include a cam plate pivotally secured to the latch body, and a connecting arm pivotally connected to the cam plate at a pivot joint and operatively connected to the pawl, the pivot joint configured to rotate over center with respect to a point of attachment of the pawl to the latch body. The pawl can include an inclined surface for mating with a corresponding inclined surface of the latch plate when the pawl member is in the engaged position, said inclined surface restricting relative rotation between the first and second associated tubes when the latch mechanism is engaged. The latch body can include a mounting flange for securing the latch body to the first tube section.

A trigger post can be mounted to a third tube section into which the first and second tube sections are configured to be telescopically received, wherein the toggle mechanism includes a cam plate including at least one catch portion configured to interlock with the trigger post, the trigger post operative to toggle the toggle mechanism between the lock and unlocked position based on relative movement between adjacent tube sections. The trigger post can include a T-shape portion thereof having a stem portion and a top portion generally perpendicular to the stem portion, and the at least one catch portion of the cam plate can be configured to interlock with respective opposite sides of the top portion on respective opposite sides of the stem portion. The toggle mechanism can be configured to move to the lock position when the trigger post is drawn away from the latch body when the tube section to which the latch body is mounted is extended from the tube section to which the trigger post is mounted, and to the unlocked position when the trigger post impinges on the toggle mechanism when the trigger post is brought towards the latch body when the tube section to which the latch body is mounted is retracted into the tube section to which the trigger post is mounted.

In accordance with another aspect, a latch for use with a telescoping mast having a plurality of tube sections comprises a latch body including a latching mechanism mountable to an associated tube section, the latch body supporting a latch mechanism including a pawl movable between an unlatched position and a latched position for engaging or disengaging with an associated latch plate mounted to a second tube, and a toggle mechanism operatively connected to said latching mechanism and moveable between an unlocked position and a locked position, wherein said toggle mechanism is configured to automatically translate between the locked and unlocked positions, and said pawl is configured to automatically translate between the latched and unlatched positions as the telescoping mast is extending and/or retracted.

BRIEF DESCRIPTION OF THE DRAWINGS

FIG. 4 is a cross-sectional view of the mast and exemplary latch of FIG. 2 in a third position.

FIG. 5 is a cross-sectional view of the mast and exemplary latch of FIG. 2 in a fourth position.

FIG. 6 is a cross-sectional view of the mast and exemplary latch assembly in a fifth position.

FIG. 7 is a cross-sectional view of the mast and exemplary latch assembly in a sixth position.

FIG. 8 is a cross-sectional view of the mast and exemplary latch assembly in a seventh position.

FIG. 9 is a cross-sectional view of the mast and exemplary latch assembly in an eighth position.

DETAILED DESCRIPTION

Figure 1A:
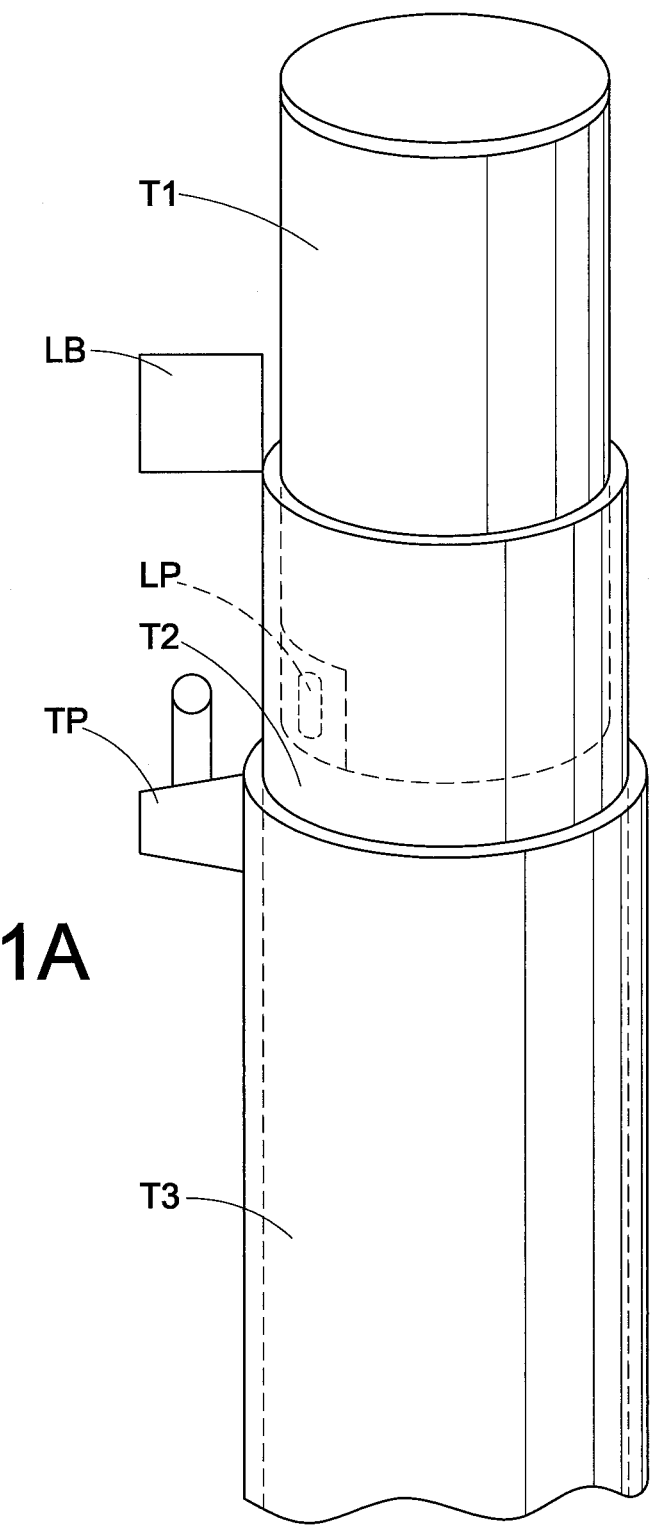
FIG. 1A is schematic view of an exemplary mast including a latch assembly in accordance with the disclosure.

With initial reference to FIG. 1A, a typical drive system for one type of mechanical mast provides lift to the smallest diameter tube T1 first, and then this first tube lifts the next larger (second) tube T2 through physical interference between the tubes once the first diameter tube T1 is fully deployed/extended. During the initial movement of the second tube T2, the first tube T1 is disengaged from the drive mechanism and the second tube T2 is engaged. The first tube T1 is locked to the second tube T2 in the extended position, and the second tube T2 is released from a third tube T3 during this transition period. The second tube T2 is then the driven tube and the process repeats itself with the next set of three tubes for however many tubes comprise the mast, or until a desired mast height is reached. Retraction is generally the reverse of extension.

An exemplary latch assembly in accordance with the present disclosure includes a latch body LB mounted to the larger diameter second tube T2 and a latch plate LP mounted to the first tube T1. As will be described in detail below, a latch mechanism is supported by the latch body LB, and a toggle mechanism is operatively connected to the latch mechanism. The latch mechanism includes a pawl member pivotable between an engaged position for interlocking with a corresponding recess in the latch plate LP to thereby restrict axial movement between the first and second tube sections T1 and T2, and a disengaged position allowing relative axial movement between the first and second tube sections. The toggle mechanism is movable between an over-center locked configuration corresponding to the engaged position of the latch mechanism and an unlocked configuration corresponding to the disengaged position of the latch member.

As previously mentioned, it is preferred to have the latch assembly function without outside power or manual intervention. In the present disclosure, the latch is triggered when the latch plate LP of the first tube T1 engages with the latch body LB on the second tube T2 and begins to lift the second tube T2. The latch mechanism on the second tube T2 has been held in the unlocked position by the interference of a roller on the latch mechanism with a dyke on the first top tube T1. At the point where the latch plate LP of the top tube T1 engages the latch body LB of the second tube T2, the dyke is no longer prohibiting the locking sequence (the dyke is clear of the roller) and a recess in the latch plate provides an open area for a pawl of the latch mechanism to rotate into. This action can be powered or urged by a small spring or other biasing element acting between the latch body and a pivoting member of the toggle mechanism that is configured to engage a trigger post on the third tube, as will be described in more detail below. In addition or in the alternative, a trigger post TP can be designed with certain features that rotate the pivoting member of the toggle mechanism to the locked position as the latch body is lifted off the trigger post. The locking process cannot be completed until the latch body of the second tube T2 is lifted off of the trigger post of the third tube T3 during extension. This process is repeated until the mast is raised to the desired height.

During mast retraction, the first driven tube is the last tube to be raised (e.g., the largest diameter tube raised, e.g. tube T3). The driven tube is lowered to the point where contact is made between the latch mechanism/toggle mechanism of the driven tube, with the trigger post of the tube below (e.g., a trigger post associated with the base tube rigidly mounted to the vehicle). The upward force provided by the trigger post overcomes the biasing spring and drives the toggle mechanism upward to the unlocked position. During this process the latch body is unlocked from the next smaller tube and locked to the next larger tube (e.g., the base tube). The smaller tube is now the driven tube and the process is repeated until the mast is retracted to the desired position.

With the mast arrangement of FIG. 1A as a general starting point, the features of the latch assembly of the present disclosure will now be described in detail in connection with FIGS. 1A-9.

Figure 1B:
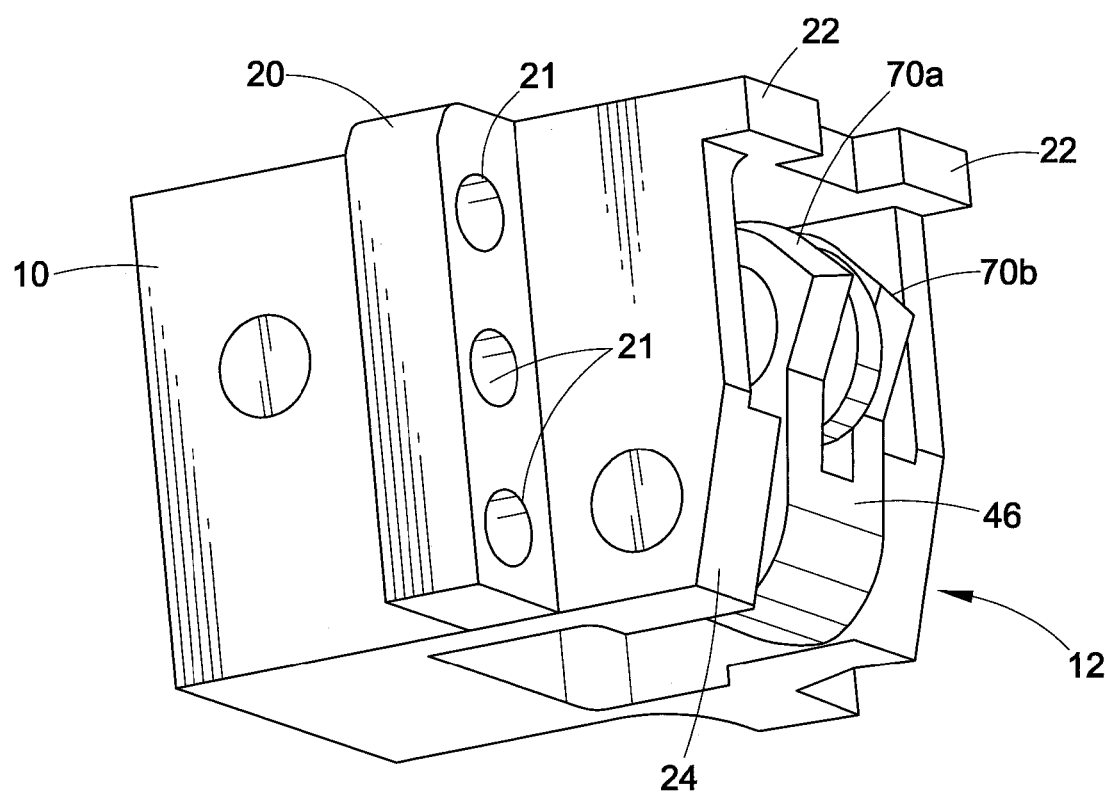
FIG. 1B is a perspective view of an exemplary latch assembly in accordance with the disclosure.

Turning now to FIG. 1B, an exemplary latch body 10 is illustrated. The latch body 10 has a cavity in which a latch mechanism 12 and a toggle mechanism 16 (not visible in FIG. 1B) for locking the latching mechanism 12 in an engaged position, are mounted. The latch body 10 includes mounting flanges 20 for mounting the latch body 10 to a tube section of a telescoping mast. The mounting flanges 20 include a plurality of holes 21 for receiving fasteners, such as bolts, for securing the latch body 10 to the tube section. A top lip or flange 22 extends outwardly from a major portion of the latch body and is configured to be engaged by a latch plate of an adjacent tube section during extension of the mast. A lower angled surface 24 is provided for guiding the tube portion relative to an adjacent tube portion during extension and retraction.

Figure 2:
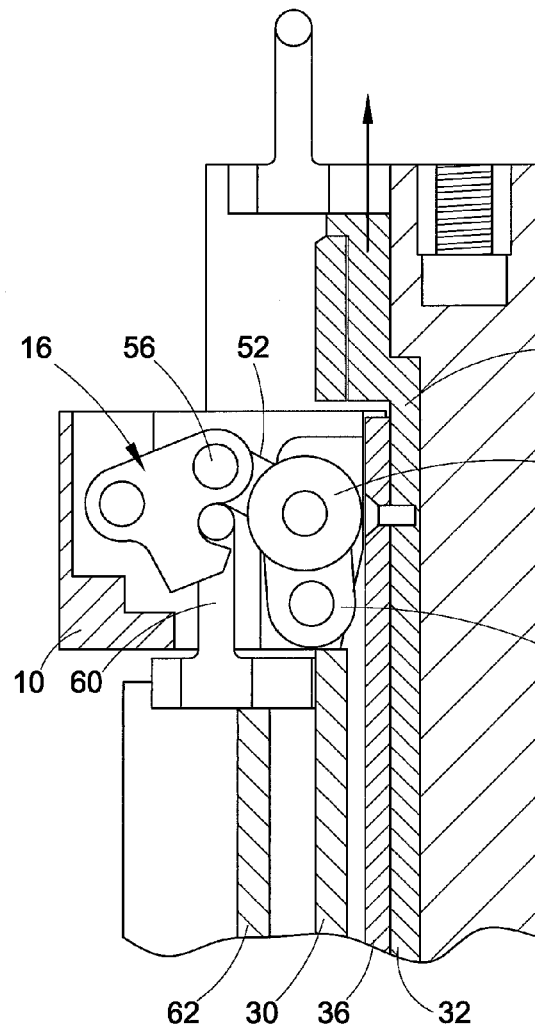
FIG. 2 is a cross-sectional view of a mast including the exemplary latch assembly of FIG. 1B in a first position.

Turning to FIGS. 2-9, and initially to FIG. 2, exemplary latch body 10 is illustrated mounted to a first tube section 30 (e.g., in a similar manner that latch body LB is mounted to tube T2 in FIG. 1A). A second tube section 32 (e.g., tube T1 of FIG. 1A) is nested within the first tube section 30 and, as will be seen, includes a latch plate mounted thereto (e.g., in a similar manner the tube T1 includes latch plate LP in FIG. 1A). A dyke 36 (rail-like structure) is mounted to an outer circumferential surface of the second tube section 32 and extends along a major portion of the axial length of the upper tube 32. The dyke 36 is slideably received in a corresponding groove in an inner circumferential surface of the first tube section 30. The dyke 36 and groove engage each other to restrict relative rotation of the tube sections 30 and 32, and also provide a surface upon which a roller 42 of the latch mechanism 12 rides preventing the latch from locking until the dyke 36 has cleared the latch body 10.

Figure 3:
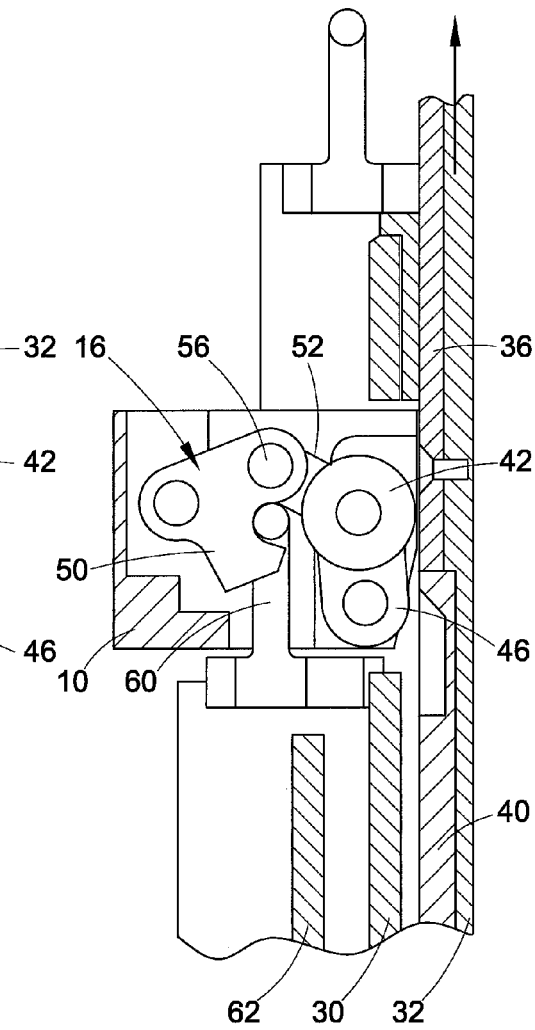
FIG. 3 is a cross-sectional view of the mast and exemplary latch of FIG. 2 in a second position.

With additional reference to FIG. 3, the second tube section 32 is shown in a partially extended position relative to its position in FIG. 2. As such, latch plate 40 secured to the second tube section 32 is now visible. Roller 42 of the latch mechanism 12 is still engaged with dyke 36. Roller 42 is attached to pivoting pawl 46. Thus, pawl 46 of the latch mechanism 12 remains in a disengaged position. As will be appreciated, the toggle mechanism 16 is in an unlocked position in FIGS. 1-3. The toggle mechanism 16 includes a cam plate 50 that is mounted for rotation to the latch body. A connecting arm 52 connects the cam plate 50 to the pawl 46. Connecting arm 52 is secured to the cam plate 50 by a pivot joint 56.

It will be noted that trigger post 60, mounted to the next larger tube section 62 (e.g., tube T3 in FIG. 1A) is engaged with cam plate 50 and holds the toggle mechanism 16 in the unlocked position while the latch body 10 is nested on the next larger tube section 62. It will also be appreciated that the trigger post 60 interlocks with catches 64 of the cam plate 50 such that, the trigger post 60 toggles the toggle mechanism 16 to a locked position when withdrawn from the latch body 10, as will now be described.

Turning to FIG. 4, tube section 32 is further extended until latch plate 40 engages flange 22 of the latch body 10. Further extension of tube section 32 lifts tube section 30 and latch body 10 above tube portion 62 such that the trigger post 60 is withdrawn from the latch body 10.

With reference to FIG. 5, tube section 30 is lifted further and trigger post 60 is nearly fully withdrawn from the latch body 10. As trigger post 60 and latch body 10 are separated, catches 64 cause rotation of the cam plate 50 to the latched position shown. To this end, trigger post 60 can include features, such as protrusions 65 extending normal to the plane of FIG. 5, that cooperate with the catches 64 as the trigger post 60 is separated from the latch body 10 to cause rotation of the cam plate 50.

At about the same time that the toggle mechanism 16 shifts between the unlocked and locked position, pawl 46 is shifted from an unlatched position to a latched position where it engages in a recess of the latch plate 40. As will be appreciated, once the pawl 46 is latched in the recess and the toggle mechanism 16 is moved to the locked position, the pawl 46 is prevented from returning to the unlatched position until the toggle mechanism 16 is moved to the unlocked position. The transition between unlatched/latched and unlocked/locked is generally smooth because it is, at least in part, driven and/or controlled by the movement of the latch body 10 relative to the trigger post 60. This results in a smooth and quiet action.

The final position of the latch assembly in a latched and locked state is illustrated in FIG. 6. As will be appreciated, this process can be repeated for all the tube sections of the telescoping mast until a desired height is achieved. It should be noted that the toggle mechanism in the final latched and locked state of the latch assembly is in an over-center position and backed up by the latch body 10. Release of the latch assembly from the locked state is generally not possible by merely acting on the pawl itself, unless the toggle mechanism is urged from its position shown in FIG. 6, as will now be described.

FIGS. 7-9 illustrate retraction of the tube sections of the mast. Retraction is essentially the reverse of the extension process described above. Beginning with FIG. 7, it can be seen that as tube section 30 is lowered into tube section 62, the trigger post 60 begins to penetrate the latch body 10 until it engages toggle mechanism 16. Further lowering of tube section 30 cause trigger post 60 to urge toggle mechanism 16 to the unlocked position, as shown in FIG. 8. As toggle mechanism 16 undergoes the switch to the unlocked state, the latch mechanism is unlatched. Specifically, pawl 46 is rotated out of the recess in the latch plate 40 (mounted to tube section 32) and returned to an unlatched position.

Once the latch mechanism is unlatched from the latch plate 40, tube section 32 can then be lowered. This is shown in FIG. 9.

The toggle latch assembly of the present disclosure has several improvements over current latches. For example, the toggle latch mechanism cannot be moved by an outward radial force applied to the pawl 46, unlike some currently known latches. The geometry of the toggle mechanism is such that it moves over center and is backed up by the latch body to keep the pawl in the locked position. This inhibits the deflection of the mast by providing a rigid inclined surface to mate with a similar inclined surface on the latch plate.

As shown in FIG. 1B, pawl 46 has angled engagement surfaces 70a and 70b for engaging mating surfaces of the latch plate (or other surface associated with the adjacent tube section). The surfaces 70a and 70b can be angled in two or more dimensions relative to a longitudinal axis of the tube sections. When the side load on these rigid inclined surfaces is large enough for the resulting vertical component to lift the tubes above the latch mechanism, the load on the latch mechanism is limited due to wear bands provided on the tubes that are designed to engage to pick up such horizontal force. The angle of the inclined surface is optimally designed to allow the latch mechanism to resist the common side loads caused by low winds but allow the tubes to pick up the load in more extreme conditions. This helps to meet the deflection requirements for sensitive payloads without having to make the latch large enough to handle the worst case loads. The compound angle of the surfaces of the pawl 46 can match similar angled surfaces on the latch plate so as to inhibit rotational movement between two adjacent tubes when latched together.

The latch assembly herein described is also much quieter due to its geometry and controlled movement. The rate of the mechanism locking is limited (or controlled) by the trigger post as a function of how fast the tube sections are extended or retracted. Current latches snap over center without anything limiting its rate of rotation, which can be noisy. The way the trigger post interfaces with the locking mechanism has the advantage of ensuring positive movement in both directions. If the spring loses some of its strength or the movement of the mechanism is hard due to wear or dirt the action of the trigger post will force the mechanism to lock or unlock.

Another improvement of the disclosed mechanism is the addition of the dyke which ensures the sequential extension of the tube sections. The roller in the middle of the pawl makes contact with the dyke keeping the latch unlocked until the locking recess is reached.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A latch assembly for a telescoping mast having a plurality of telescoping tube sections, the latch assembly comprising:
   a latch body mountable to a first associated tube section;
   a latch mechanism supported by the latch body;
   a toggle mechanism operatively connected to the latch mechanism; and
   a latch plate mountable to a second associated tube section;
   a trigger post mountable to a third associated tube section;
   wherein the latch mechanism includes a pawl member pivotable between an engaged position for interlocking with a corresponding recess in the latch plate to thereby restrict axial movement between the first and second tube sections, and a disengaged position allowing relative axial movement between the first and second tube sections;
   wherein the toggle mechanism is movable between an over-center locked configuration corresponding to the engaged position of the latch mechanism and an unlocked configuration corresponding to the disengaged position of the latch mechanism;
   wherein the toggle mechanism further includes a cam plate rotatably supported by the latch body, and a connecting arm pivotally connected to the cam plate at a pivot joint and operatively connected to the pawl member, the pivot joint configured to rotate over center with respect to a point of attachment of the pawl member to the latch body, the cam plate configured to interlock with the trigger post when the first associated tube section is fully nested within the third associated tube section and the toggle mechanism is in the unlocked configuration, the trigger post operative to rotate the cam plate in a first direction to toggle the toggle mechanism from the locked configuration corresponding to the engaged position of the latch mechanism to the unlocked configuration corresponding to a disengaged position of the latch mechanism during nesting of the first associated tube section within the third associated tube section, and to rotate the cam plate in a second direction to toggle the toggle mechanism from the unlocked configuration to the locked configuration during extension of the first associated tube section from the third associated tube section;
   whereby the latch assembly is configured to lock together stowed adjacent associated tube sections and is configured to lock together extended adjacent associated tube sections.

2. The latch assembly as set forth in claim 1, wherein the pawl member includes an inclined surface for mating with a corresponding inclined surface of the latch plate when the pawl member is in the engaged position, said inclined surface restricting relative rotation between the first and second associated tube sections when the latch mechanism is engaged.

3. The latch assembly as set forth in claim 1, wherein the pawl member includes an inclined surface having a compound angle for mating with a corresponding inclined surface of the latch plate.

4. The latch assembly as set forth in claim 1, wherein the latch body includes a mounting flange for securing the latch body to an associated tube section.

5. The latch assembly as set forth in claim 1, wherein the trigger post includes a stem portion and a top portion generally perpendicular to the stem portion, and wherein the cam plate includes a catch portion adapted to interlock with the top portion of the trigger post to restrict movement between the associated first and third tube sections.

6. The latch assembly as set forth in claim 5, wherein the toggle mechanism is configured to move to the locked configuration when the trigger post is drawn away from the latch body, and to the unlocked configuration when the trigger post impinges on the toggle mechanism when the trigger post is brought towards the latch body.

7. A telescoping mast comprising:
a plurality of telescoping tube sections;
a latch body mounted to a first tube section and supporting a latch mechanism and a toggle mechanism operatively connected to the latch mechanism; and
a latch plate mounted to a second tube section, said second tube section adapted to be telescopically received within the first tube section;
a trigger post mounted to a third tube section, said third tube section adapted to telescopically receive both of the first and second tube sections;
wherein the latch mechanism includes a pawl member pivotable between an engaged position for interlocking with a corresponding recess in the latch plate to thereby restrict axial movement between the first and second tube sections when the second tube section is extended, and a disengaged position allowing relative axial movement between the first and second tube sections such that the second tube section can be telescoped into the first tube section; and
wherein the toggle mechanism is movable between an over-center locked configuration corresponding to the engaged position of the latch mechanism and an unlocked configuration corresponding to the disengaged position of the latch member;
wherein the toggle mechanism further includes a cam plate rotatably supported by the latch body, and a connecting arm pivotally connected to the cam plate at a pivot joint and operatively connected to the pawl member, the pivot joint configured to rotate over center with respect to a point of attachment of the pawl member to the latch body, the cam plate configured to interlock with the trigger post of the third tube section when the first tube section is fully nested within the third tube section and the toggle mechanism is in the unlocked configuration, the trigger post operative to rotate the cam plate in a first direction to toggle the toggle mechanism from the locked configuration corresponding to the engaged position of the latch mechanism to the unlocked configuration corresponding to a disengaged position of the latch mechanism during nesting of the first tube section within the third tube section, and to rotate the cam plate in a second direction to toggle the toggle mechanism from the unlocked configuration to the locked configuration during extension of the first tube section from the third tube section;
whereby the latch assembly locks together the first and third tube section when the first tube section is fully received in the third tube section, and releases the first tube section from the third tube section and locks the first tube section to the second tube section when the first tube section is at least partially extended from the third tube section.

8. A telescoping mast as set forth in claim 7, wherein the pawl member includes an inclined surface for mating with a corresponding inclined surface of the latch plate when the pawl member is in the engaged position, said inclined surface restricting relative rotation between the first and second tube sections when the latch mechanism is engaged.

9. A telescoping mast as set forth in claim 7, wherein the pawl member includes an inclined surface having a compound angle for mating with a corresponding inclined surface of the latch plate.

10. A telescoping mast as set forth in claim 7, wherein the latch body includes a mounting flange for securing the latch body to the first tube section.

11. A telescoping mast as set forth in claim 7, wherein the trigger post includes a stem portion and a top portion generally perpendicular to the stem portion, and wherein the at least one catch portion of the cam plate is configured to interlock with the top portion of the trigger post to restrict movement between the associated first and second tube sections.

12. A telescoping mast as set forth in claim 7, wherein the toggle mechanism is configured to move to the locked configuration when the trigger post is drawn away from the latch body when the tube section to which the latch body is mounted is extended from the tube section to which the trigger post is mounted, and to the unlocked configuration when the trigger post impinges on the toggle mechanism when the trigger post is brought towards the latch body when the tube section to which the latch body is mounted is retracted into the tube section to which the trigger post is mounted.

* * * * *